(12) United States Patent
Gil et al.

(10) Patent No.: US 9,792,038 B2
(45) Date of Patent: Oct. 17, 2017

(54) FEEDBACK VIA AN INPUT DEVICE AND SCRIBBLE RECOGNITION

(75) Inventors: Erez Kikin Gil, Bellevue, WA (US); Doreen Nelson Grieb, Kirkland, WA (US); Matthew Kotler, Sammamish, WA (US); Patrick Malatack, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/588,457

(22) Filed: Aug. 17, 2012

(65) Prior Publication Data

US 2014/0049521 A1   Feb. 20, 2014

(51) Int. Cl.
| | |
|---|---|
| G06F 3/0481 | (2013.01) |
| G06F 3/0488 | (2013.01) |
| G06F 3/01 | (2006.01) |
| G06F 3/0354 | (2013.01) |
| C01B 31/02 | (2006.01) |

(52) U.S. Cl.
CPC .......... G06F 3/04883 (2013.01); G06F 3/016 (2013.01); G06F 3/0481 (2013.01); C01B 31/0226 (2013.01)

(58) Field of Classification Search
CPC .................. G06F 3/03545; G06F 3/04883
USPC .......................................................... 345/179
See application file for complete search history.

(56) References Cited

U.S. PATENT DOCUMENTS

| | | | | |
|---|---|---|---|---|
| 5,220,649 A | * | 6/1993 | Forcier | 715/273 |
| 5,260,697 A | * | 11/1993 | Barrett | G06F 3/038 345/173 |
| 5,481,278 A | * | 1/1996 | Shigematsu | G06F 3/0481 345/156 |
| 5,500,935 A | * | 3/1996 | Moran et al. | 715/863 |
| 5,500,937 A | * | 3/1996 | Thompson-Rohrlich | G06F 3/04883 345/173 |
| 5,539,427 A | * | 7/1996 | Bricklin et al. | 345/622 |
| 5,570,113 A | * | 10/1996 | Zetts | 345/173 |

(Continued)

OTHER PUBLICATIONS

Kamuro, et al., "Ungrounded Kinesthetic Pen for Haptic Interaction with Virtual Environments", In Proceedings of the 18th IEEE International Symposium on Robot and Human Interactive Communication, Sep. 27, 2009, pp. 436-441, 6 pages.

(Continued)

*Primary Examiner* — Claire X Pappas
*Assistant Examiner* — Robert Stone

(57) ABSTRACT

Feedback via an input device associated with an interaction with a point of interest (POI) and scribble recognition is provided. When using an input device to navigate a GUI, various POIs may be determined as elements beneficial for a user to notice, pay attention to, or avoid. When an input is received that may be associated with a POI, feedback may be provided. Feedback may include haptic, visual, or audible feedback. Scribble recognition may also be provided. When using an input device (e.g., digital pen), a user may "scribble" in a margin to test pen attributes. Upon recognizing a scribble, alternative pen attributes may be presented in a contextual menu. In addition, the scribble may be automatically erased upon selection of a pen attribute or upon receiving input in another area of the UI or alternatively, feedback may be provided prior to erasure of the scribble input.

20 Claims, 13 Drawing Sheets

(56) References Cited

U.S. PATENT DOCUMENTS

| | | | | |
|---|---|---|---|---|
| 5,583,542 | A * | 12/1996 | Capps et al. | 345/173 |
| 5,923,793 | A * | 7/1999 | Ikebata | 382/311 |
| 6,094,197 | A * | 7/2000 | Buxton | G06F 3/0482 341/22 |
| 6,239,792 | B1 * | 5/2001 | Yanagisawa | G06F 3/0488 345/159 |
| 6,459,442 | B1 | 10/2002 | Edwards et al. | |
| 7,259,752 | B1 * | 8/2007 | Simmons | 345/173 |
| 7,793,233 | B1 * | 9/2010 | Sellers | G06F 17/241 715/780 |
| 2002/0033795 | A1 * | 3/2002 | Shahoian | G06F 1/1616 345/156 |
| 2002/0049787 | A1 * | 4/2002 | Keely | G06F 17/211 715/205 |
| 2002/0057263 | A1 * | 5/2002 | Keely et al. | 345/179 |
| 2002/0163497 | A1 | 11/2002 | Cunningham et al. | |
| 2003/0023644 | A1 * | 1/2003 | Bryborn | G06F 3/0321 715/268 |
| 2003/0174121 | A1 * | 9/2003 | Poupyrev et al. | 345/156 |
| 2004/0021647 | A1 * | 2/2004 | Iwema | G06F 3/0488 345/179 |
| 2004/0070573 | A1 | 4/2004 | Graham | |
| 2005/0111736 | A1 * | 5/2005 | Hullender et al. | 382/188 |
| 2005/0243072 | A1 * | 11/2005 | Denoue | G06F 3/016 345/179 |
| 2005/0248549 | A1 | 11/2005 | Dietz et al. | |
| 2005/0275638 | A1 * | 12/2005 | Kolmykov-Zotov et al. | 345/179 |
| 2006/0001656 | A1 | 1/2006 | LaViola et al. | |
| 2006/0085767 | A1 * | 4/2006 | Hinckley | G06F 3/04842 715/863 |
| 2006/0087497 | A1 | 4/2006 | Borgaonkar et al. | |
| 2006/0267966 | A1 * | 11/2006 | Grossman | G06F 3/0346 345/179 |
| 2007/0285399 | A1 * | 12/2007 | Lund | 345/173 |
| 2008/0143693 | A1 * | 6/2008 | Schena | G01D 7/007 345/179 |
| 2008/0266066 | A1 | 10/2008 | Braun et al. | |
| 2009/0021494 | A1 | 1/2009 | Marggraff et al. | |
| 2009/0135164 | A1 * | 5/2009 | Kyung et al. | 345/179 |
| 2009/0303199 | A1 * | 12/2009 | Cho | G06F 3/04883 345/173 |
| 2009/0309825 | A1 * | 12/2009 | Sodergren et al. | 345/156 |
| 2010/0231550 | A1 * | 9/2010 | Cruz-Hernandez et al. | 345/174 |
| 2011/0050653 | A1 * | 3/2011 | Miyazawa | G06F 3/0482 345/179 |
| 2011/0115751 | A1 * | 5/2011 | Wernersson | 345/179 |
| 2011/0175855 | A1 * | 7/2011 | Youn | G06F 3/04883 345/179 |
| 2011/0210931 | A1 * | 9/2011 | Shai | G06F 3/014 345/173 |
| 2012/0019487 | A1 * | 1/2012 | Kazamaki | G06F 17/241 345/179 |
| 2012/0127088 | A1 * | 5/2012 | Pance | G06F 3/016 345/173 |
| 2012/0165074 | A1 * | 6/2012 | Soldan | G06F 3/0346 455/566 |
| 2012/0192117 | A1 * | 7/2012 | Migos | G06F 17/241 715/863 |

OTHER PUBLICATIONS

Song, et al., "Pen Light: Combining a Mobile Projector and a Digital Pen for Dynamic Visual Overlay", In Proceedings of the 27th International Conference on Human Factors in Computing Systems, Apr. 6, 2009, pp. 143-152, 10 pages.

Liao, et al., "Pen-top Feedback for Paper-based Interfaces", In Proceedings of the 19th Annual ACM Symposium on User Interface Software and Technology, Oct. 15, 2006, pp. 201-210, 10 pages.

Kyung, et al., "Design and Applications of a Pen-Like Haptic Interface with Texture and Vibrotactile Display", In Proceedings of the Frontiers in the Convergence of Bioscience and Information Technologies, Oct. 11, 2007, pp. 543-548, 6 pages.

Kyung, et al., "wUbi-Pen: Windows Graphical User Interface Interacting with Haptic Feedback Stylus", In Proceedings of the ACM SIGGRAPH, Aug. 11, 2008, pp. 1-4, 4 pages.

Lee, et al., "Haptic Pen: Tactile Feedback Stylus for Touch Screens", In Proceedings of the 17th Annual ACM Symposium on User Interface Software and Technology, Oct. 24, 2004, pp. 291-294, 6 pages.

Hemmert, et al., "Reflective Haptics: Haptic Augmentation of GUIs through Frictional Actuation of Stylus-Based Interactions", In Proceedings of the 23rd ACM Symposium on User Interface Software and Technology, Oct. 3, 2010, pp. 383-384, 2 pages.

Kyung, et al., "Precise Manipulation of GUI on a Touch Screen with Haptic Cues", In Proceedings of the World Haptics—Third Joint Eurohaptics Conference and Symposium on Haptic Interfaces for Virtual Environment and Tele-operator Systems, Mar. 18, 2009, pp. 202-207, 6 pages.

Paul, Yao, "Add Support for Digital Ink to Your Windows Applications", Published on: May 10, 2008, Available at: http://msdn.microsoft.com/en-us/magazine/cc163869.aspx, 14 pages.

Poon, et al., "Scribbler: A Tool for Searching Digital Ink", In Proceedings of the Conference Companion on Human Factors in Computing Systems, May 7, 1995, pp. 252-253, 5 pages.

International Search Report dated Mar. 24, 2014 cited in Application No. PCT/US2013/054596, 14 pgs.

"First Office Action and Search Report Issued in Chinese Patent Application No. 201380044125.8", Mailed Date: Nov. 3, 2016, 14 Pages.

European Communication in Application 13753938.3, dated Apr. 6, 2017, 5 pgs.

European Office Action in Application 13753938.3, dated May 12, 2017, 11 pgs.

\* cited by examiner

FEEDBACK VIA AN INPUT DEVICE AND SCRIBBLE RECOGNITION

BACKGROUND

In a digital or capacitive pen-based computing environment, a computing device, such as a slate device, tablet computing device, a wall surface computing device, etc., may be interacted with by a user by way of an interactive display and a writing implement. The writing implement may include a digital pen, capacitive pen, pointer, stylus, or other type of input device (herein referred to as a digital pen device). The interactive display may include a display surface or a writing interface.

Typically when using a digital pen device to interact with a computing device, a user may rely on visual feedback. Providing feedback may increase a user's confidence and speed as he/she interacts with software on the device. Additionally, users with disabilities such as vision and hearing disabilities may depend on feedback when using a digital pen device. The visual feedback may be limited by various factors such as the user's hand or the digital pen device occluding part of the display interface. Additionally, interacting close to a margin on the display interface may further limit screen real estate that may be devoted to visual feedback.

It is with respect to these and other considerations that the present invention has been made.

SUMMARY

Embodiments of the present invention solve the above and other problems by providing feedback via an input device as a result of an interaction with a point of interest and providing scribble recognition.

When using an input device (e.g., a digital pen device, a mouse, a stylus, etc.) to navigate a computing device's graphical user interface (GUI), there may be areas or elements on the interface that may be determined as areas or elements that may be beneficial for a user to notice, pay attention to, or avoid. These areas or elements may be referred to as points of interest (POI). For example, if a user is using a digital pen device with a tablet computing device and is approaching an edge of a document displayed on the screen, a determination may be made that the edge of the document is a POI. According to embodiments, when a determination is made that an input may be approaching or interacting with a POI, a feedback may be provided. The feedback may include haptic feedback such as a vibration, a change of friction level, a movement of the input device via a gyroscope, etc., may include a visual feedback such as a light or other type of visual signal, or may include an audible feedback such as a beep or other type of audible alert.

Embodiments may also provide for detecting scribble input. When using an input device such as a digital pen device, a user may "scribble" along a margin to test out attributes of the pen. For example, a user may "scribble" to see the color or thickness of the pen. According to embodiments, a determination may be made that an input is a scribble. Upon a detection of a scribble, a contextual menu may be presented for allowing a user to select other pen attributes (e.g., select another pen color or pen type). In addition, the scribble may be automatically erased upon selection of a pen attribute or upon receive input in another area of the user interface.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
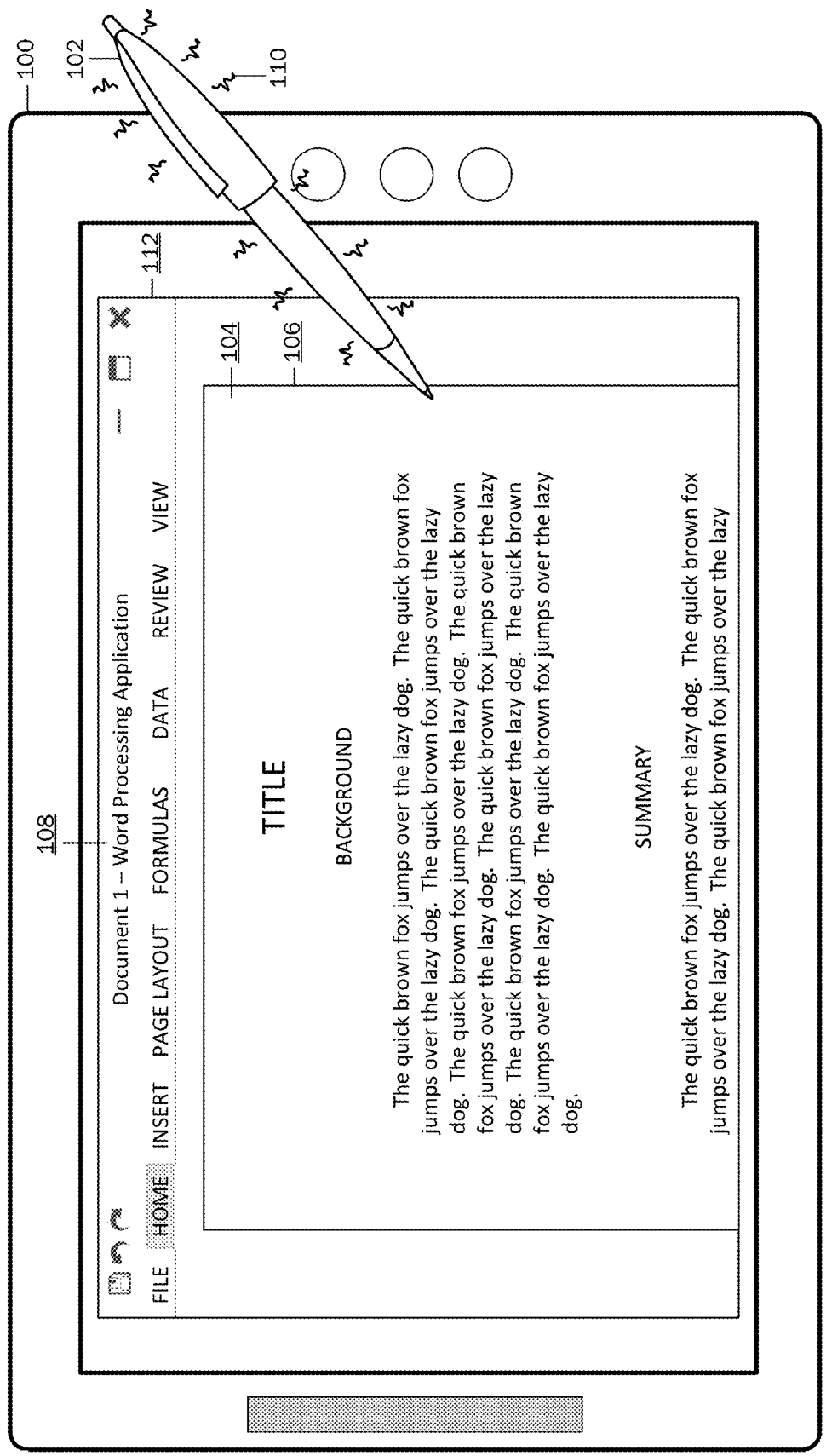
FIG. 1 is an illustration of feedback being provided when an input device is approaching an edge of a document.

As briefly described above, embodiments of the present invention are directed to providing feedback via an input device as a result of an interaction with a point of interest and to providing scribble recognition.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 is an illustration of an electronic document 104 displayed in an application pane 112 of an application 108 running on a tablet computing device 100 and an input device 102 (e.g., digital pen device) being utilized to interact with the application 108 and electronic document 104. Although a tablet computing device 100 is illustrated and utilized to describe some embodiments, it should be appreciated that a tablet computing device 100 is but one of various types of computing devices 1000 with which embodiments may operate. A common use of computing devices, such as a tablet computing device 100, may include generating and editing electronic documents 104 using various types of applications. For example, as illustrated in FIG. 1, a user may edit a word processing document 104 utilizing a word processing application. Other uses may include interacting with other types of applications 108 such as gaming applications, web browser applications, spreadsheet applications, slide presentation applications, drawing applications, music player applications, etc.

An input device 102, such as a digital pen device, may be used to interact with or navigate a computing device's graphical user interface (GUI). For example, an input device 102 may be utilized to interact with a computing device, such as a tablet computing device 100, as a commanding user interface or an inking user interface. As a user utilizes an input device 102, the user may interact with areas that may be of importance for the user to notice, pay attention to, or avoid. These areas may be referred to as points of interest (POI) 106. For example, a POI 106 may include an edge of a document 104 as illustrated in FIG. 1.

According to embodiments, a feedback 110 may be provided according to an interaction between an input device 102 (e.g., digital pen device) and a POI 106. The feedback 110 may include force feedback or haptic feedback providing a force, vibration, or motion to a user. For example, the input device 102 may comprises an actuator for providing a vibration. The feedback 110 may include other types of feedback, for example, visual feedback such as a light indication on the input device 102 (digital pen device), audible feedback, or a change of resistance between the input device 102 and the computing device. For example, a change of resistance may impact how quickly or easily a user may swipe with the input device 102 as it touches an input surface of the computing device. This may provide for a physical feeling of the user interface. The resistance level or friction level may change via a use of piezoelectric polymers or other type of technology that allows for a change of material qualities. The change in resistance level or friction level may be provided mechanically via transitioning an input portion (e.g., a part of the input device 102 used for contacting an input surface of a computing device 1000) of the input device 102 with variable friction levels. An input device 102 may comprise a gyroscope that may be utilized to move the input device and guide a user in a direction according to an interaction with a POI 106.

According to embodiments, the interaction between an input device 102 and a POI 106 causing a feedback 110 may include various interactions. For example and as illustrated in FIG. 1, as an input device 102 moves within a predetermined distance to a POI 106 such as an edge of a document 104, a feedback 110 such as a vibration may be provided. The feedback 110 may be provided via the input device 102. The computing device 100 with which the user is interacting may provide a signal to the input device 102 to provide the feedback 110.

Figure 2:
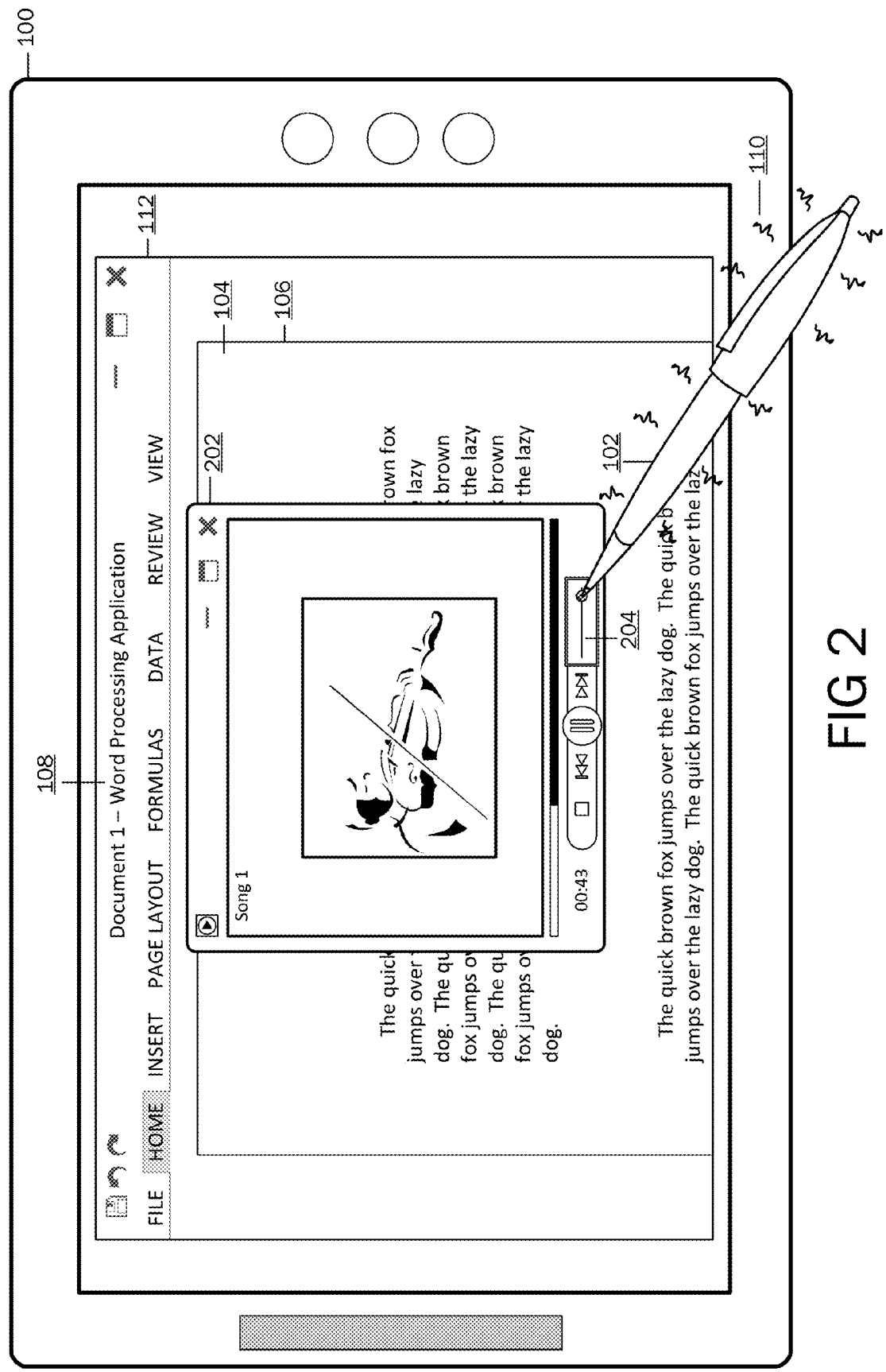
FIG. 2 is an illustration of feedback being provided when an input device is interacting with a volume control.

As another example of an interaction between an input device 102 and a POI 106 causing a feedback 110 may include an interaction with a control such as a volume level control, screen brightness control, etc. As illustrated in FIG. 2, a music player application window 202 is shown displayed on a screen of a tablet computing device 100. A volume slider control 204 is provided and, as illustrated, a user is interacting with the volume slider control 204 via a digital pen device (input device 102). Interaction with the volume slider control 204 may cause a feedback 110 such as a vibration to be communicated to the user. For example, as sound volume is increased via the volume slider control 204, increased vibration (feedback 110) may be communicated to the user. If the volume slider control 204 is moved such that the sound volume level is decreased, a lesser vibration (feedback 110) may be communicated to the user.

According to an embodiment, a determination may be made that a user is interacting with an area of a document that is different from an area or object with which he was previously interacting or interacting. Feedback 110 may be provided as a warning or precaution that the user may be interacting with an area or object that he may not intend to be interacting (POI 106). For example, a user may utilize a digital pen device (input device 102) to enter text into a document 104. The user may touch the digital pen device to an image (POI 106) in the document 104, causing a feedback 110, for example, a change of color of a light indicator on the digital pen device.

Figure 3:
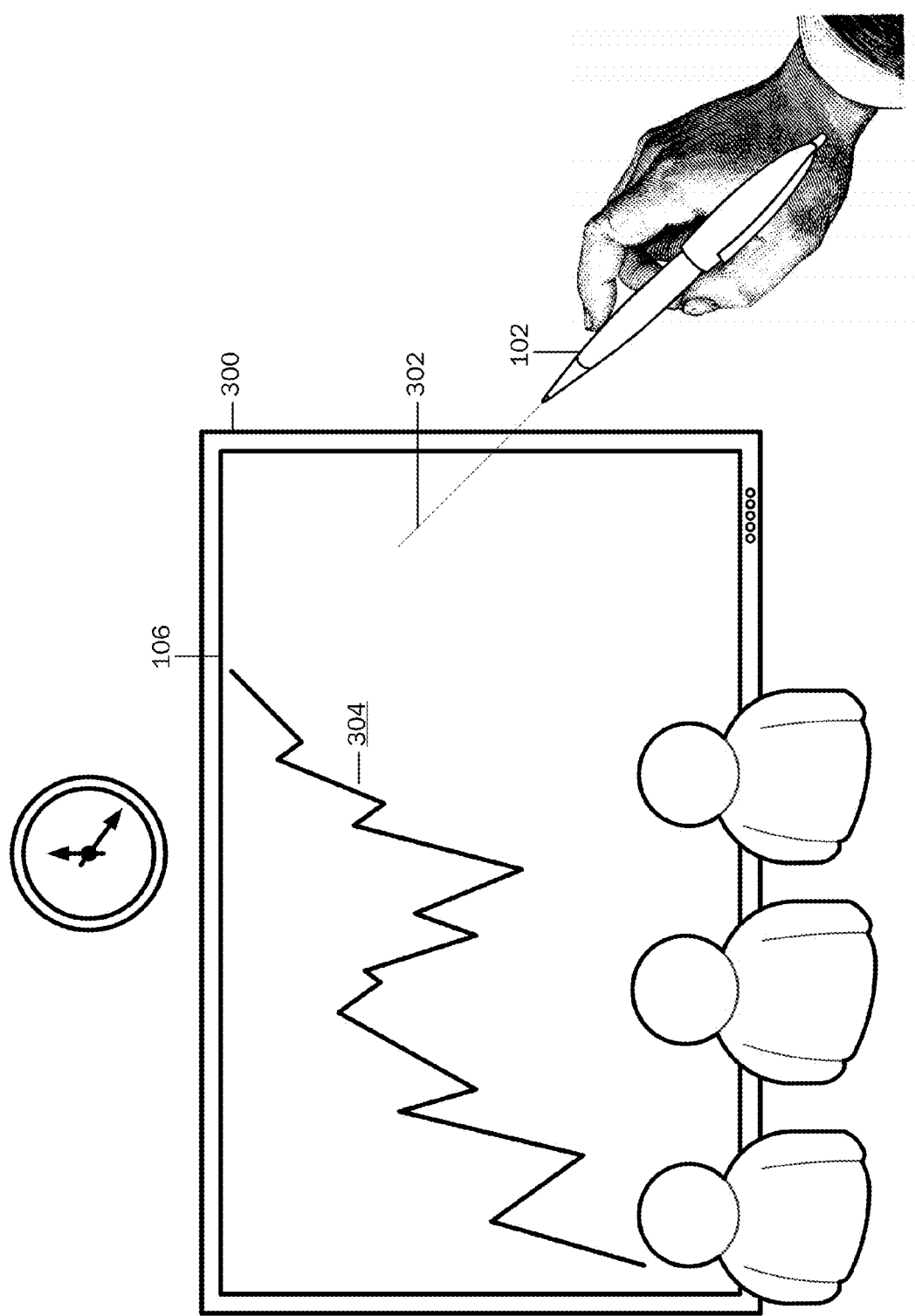
FIG. 3 is an illustration of feedback being provided when an input device is approaching an edge of a wall surface computing device.

As briefly described above, embodiments may operate in various types of computing environments and with a vast number of types of computing devices 1000. For example and as illustrated in FIG. 3, a computing device with which embodiments may be utilized may include a wall surface 300 onto which user interfaces and information of various types are projected. An input device 102 utilized for interacting with the wall surface 300 and content 304 displayed on the wall surface 300 may include a device such as a remote, infrared (IR) light pen, or a laser pointer. As shown in FIG. 3, as a POI 106 may include an edge of the wall surface 300. As a detection is made of the input device 102 or a light or other transmission 302 projected from the input device moving near the POI 106 (e.g., edge of the wall surface), a feedback 110 may be communicated to the user via the input device. For example, the input device 102 (e.g., IR light pen) may vibrate.

Figure 4:
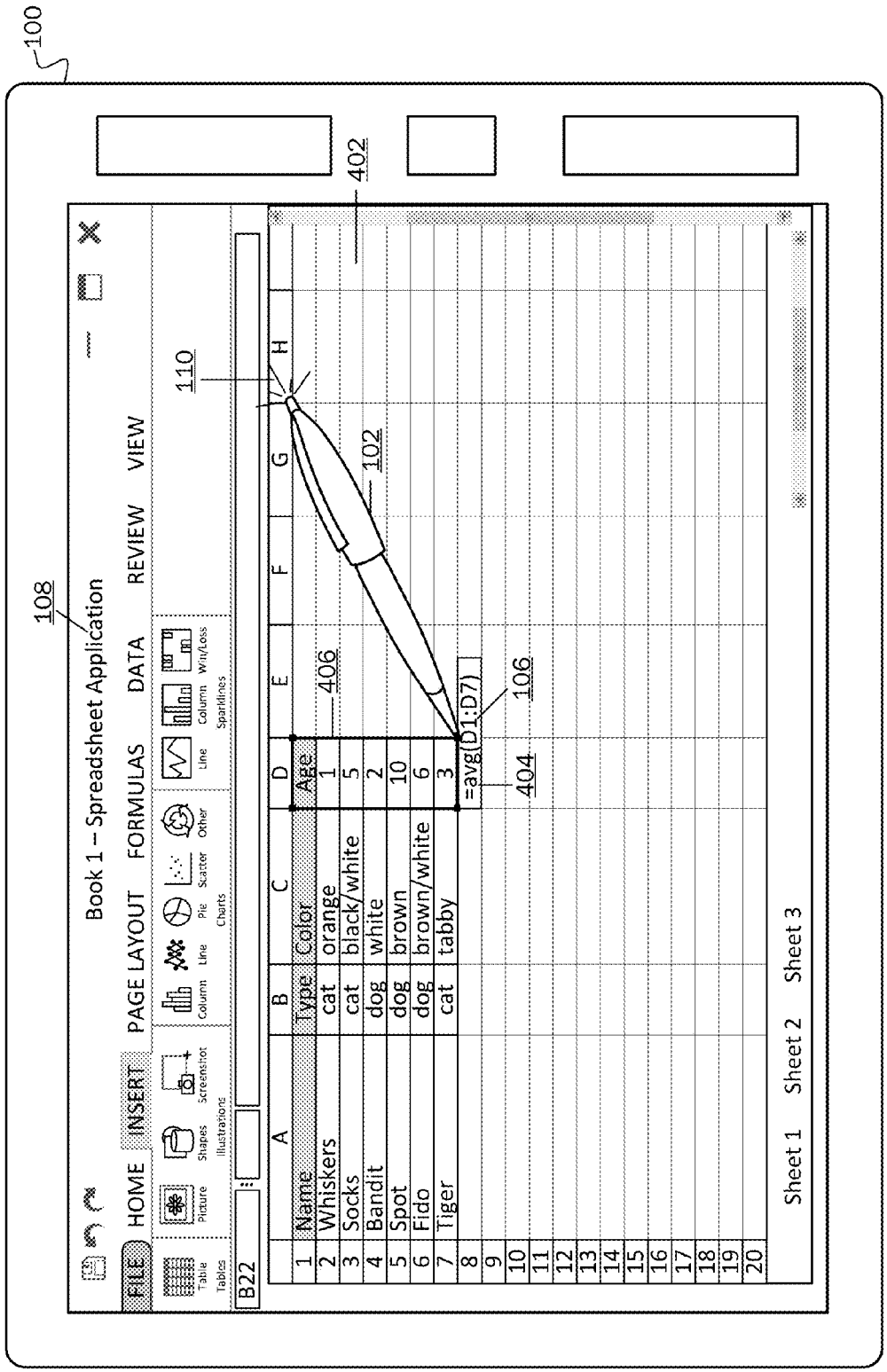
FIG. 4 is an illustration of feedback being provided when an input associated with interaction with application content is received.

According to an embodiment, a POI 106 may include an input that may be determined as unacceptable or determined as causing an error. For example and as illustrated in FIG. 4, a user may utilize an input device 102 such as a digital pen device to interact with data in an application 108 such as a spreadsheet application. The user may provide input for a computation 404, for example, select data 406 for an equation 404 (e.g., compute an average). If the data 406 selected by the user is invalid, for example and as illustrated, if the user selects a cell that contains text (e.g., cell D1) when selecting data for the average computation (i.e., equation 404), a feedback 110 may be provided. For example and as shown, the feedback 110 may include an illumination of a light on the input device 102 (e.g., digital pen device).

Figure 5:
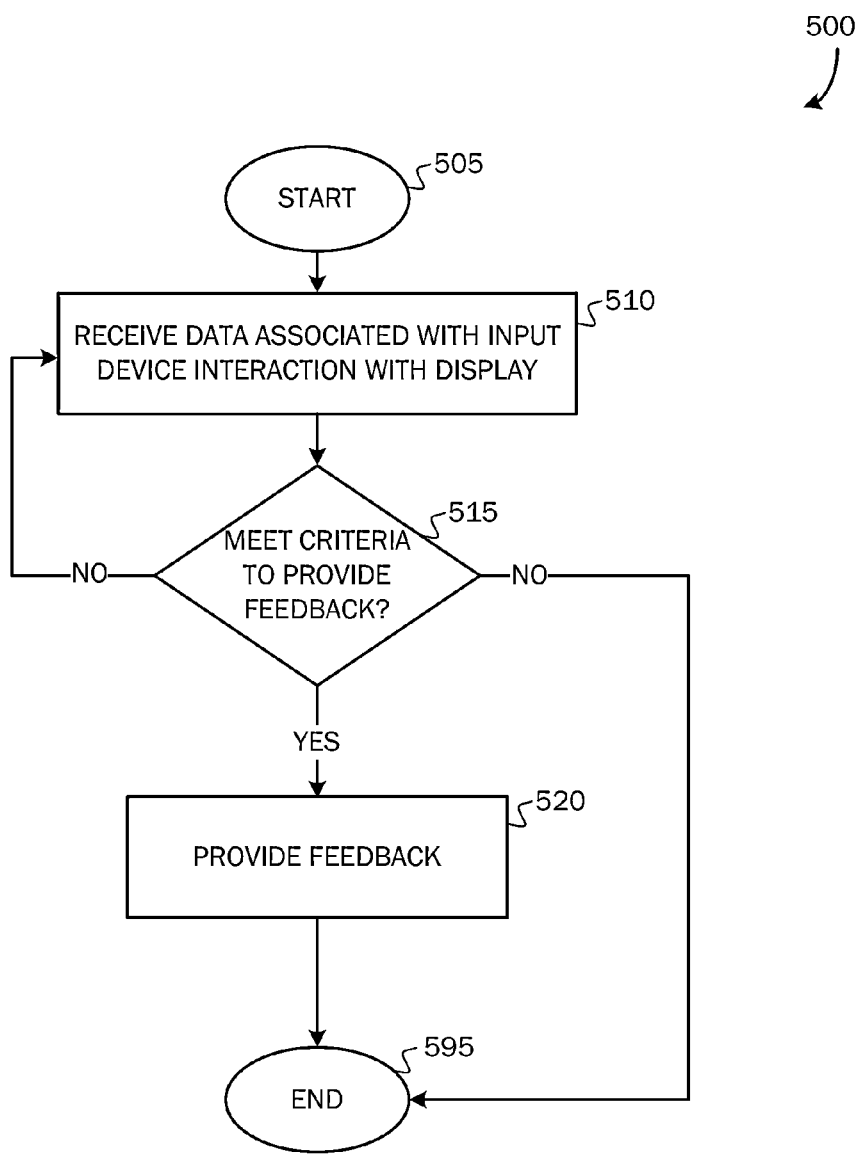
FIG. 5 is a flow chart of a method for providing feedback according to an embodiment.

A flow chart of a method for providing feedback is illustrated in FIG. 5. The method 500 starts at OPERATION 505 and proceeds to OPERATION 510 where an input via an input device 102 is received. As described above, an input device 102 may include various types of devices that may be utilized to provide data and control signals to a computing device. For example, an input device 102 may include, but is not limited to, a digital pen device (including a capacitive pen), a mouse, a stylus, a remote, infrared (IR) light pen, a laser pointer, a mouse, etc. According to embodiments, the input may include interaction with content in a document 104, interaction with an application 108, interaction with a functionality control (e.g., a volume slider control 204), etc.

At DECISION OPERATION 515, a determination is made whether the received input meets criteria for providing feedback 110. As described above, the determination for providing feedback 110 may be based on such factors as whether the input may interact with a predetermined POI 106 which may be an area that may be determined as an area or element that may be of importance for the user to notice, pay attention to, or avoid. Feedback 110 may also be provided as a notification of a forthcoming event or action to be executed by the application 108. If the input is determined to not meet criteria for providing feedback 110, the method 500 may return to OPERATION 510 where further input is received or may end at OPERATION 595.

If at DECISION OPERATION 515, a determination is made that the received input meets criteria for providing feedback 110, the method 500 may proceed to OPERATION 520 where feedback 110 may be provided. As described above with respect to FIGS. 1-4, feedback 110 may include force feedback or haptic feedback providing a force, vibration, or motion to a user or may include visual feedback or audible feedback. The method ends at OPERATION 595.

Figure 6:
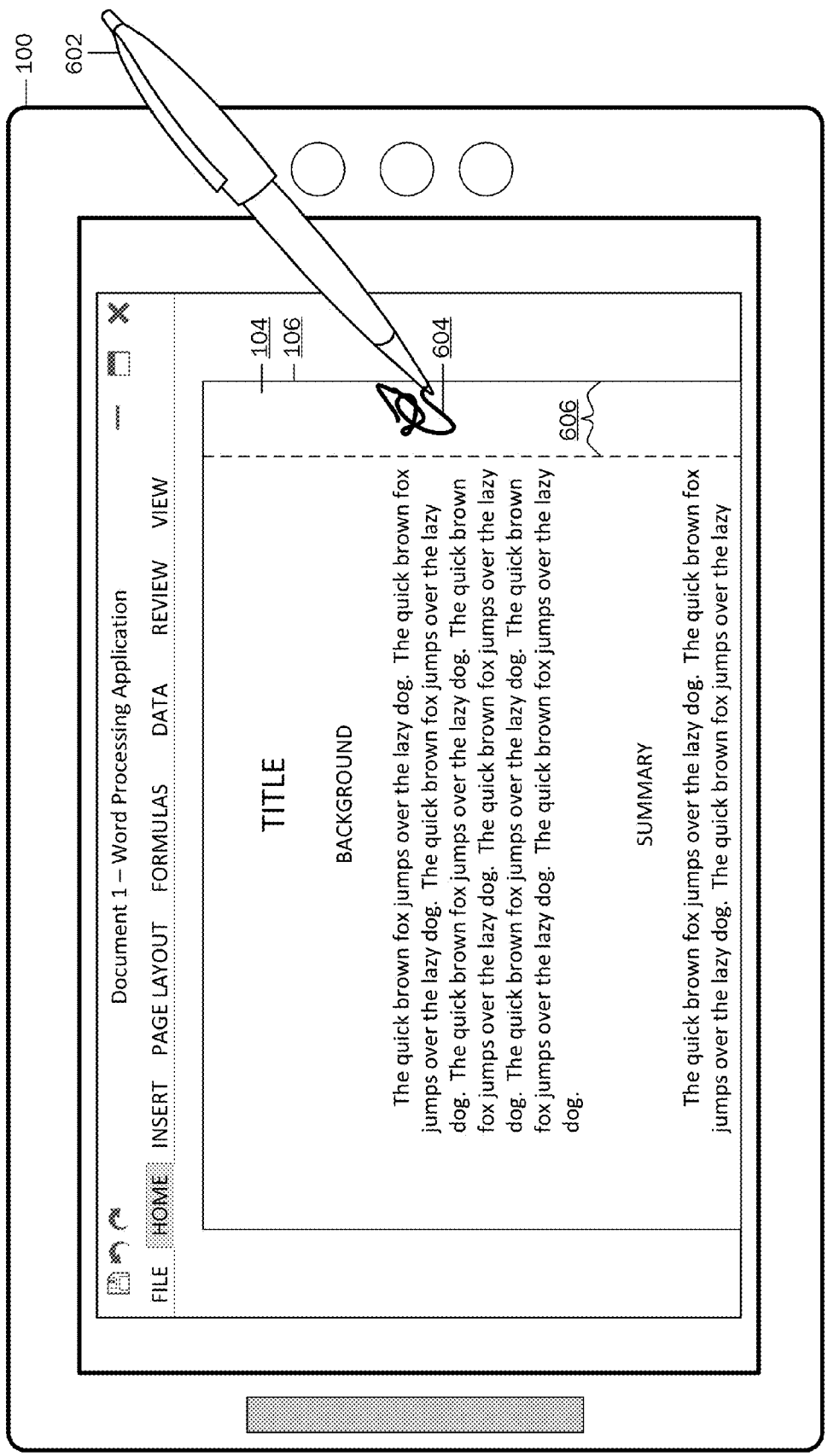
FIG. 6 is an illustration of an example scribble input.

According to another embodiment and with reference to FIG. 6, scribble input detection may be provided. When using an input device 102 such as a digital pen device 602, the user may wish to determine the type of pen he is using. For example, various selectable attributes may be available when using a digital pen device 602 such as, but not limited to, color, line size, line/brush shape, etc. Much like a person may scribble in a margin of a piece of paper when trying out an ink pen, a scribble input 604 may be received when a user "scribbles" with a digital pen device 602 along a margin 606 or in another area of an electronic document 104. The user may "scribble" for various reasons such as to determine which pen attributes are currently selected, to make notations, or to simply doodle.

As briefly described above, embodiments provide for detection of scribble input 604. Various factors may be used to determine if a received input may be a scribble input 604. Factors may include, but are not limited to, location of the input, configuration of the input, a length of time associated with drawing the input, whether a user lifts the digital pen device 602 from the screen or input surface, whether the input is within a boundary, etc. For example, the scribble input 602 illustrated in FIG. 6 may be determined as a scribble input because of the location of the input (e.g., in the margin 606 of the document 104 or near an edge 106 of the document 104) and because the configuration of the input may not be recognized as an alphanumeric character, a symbol, or a shape.

Figure 7:
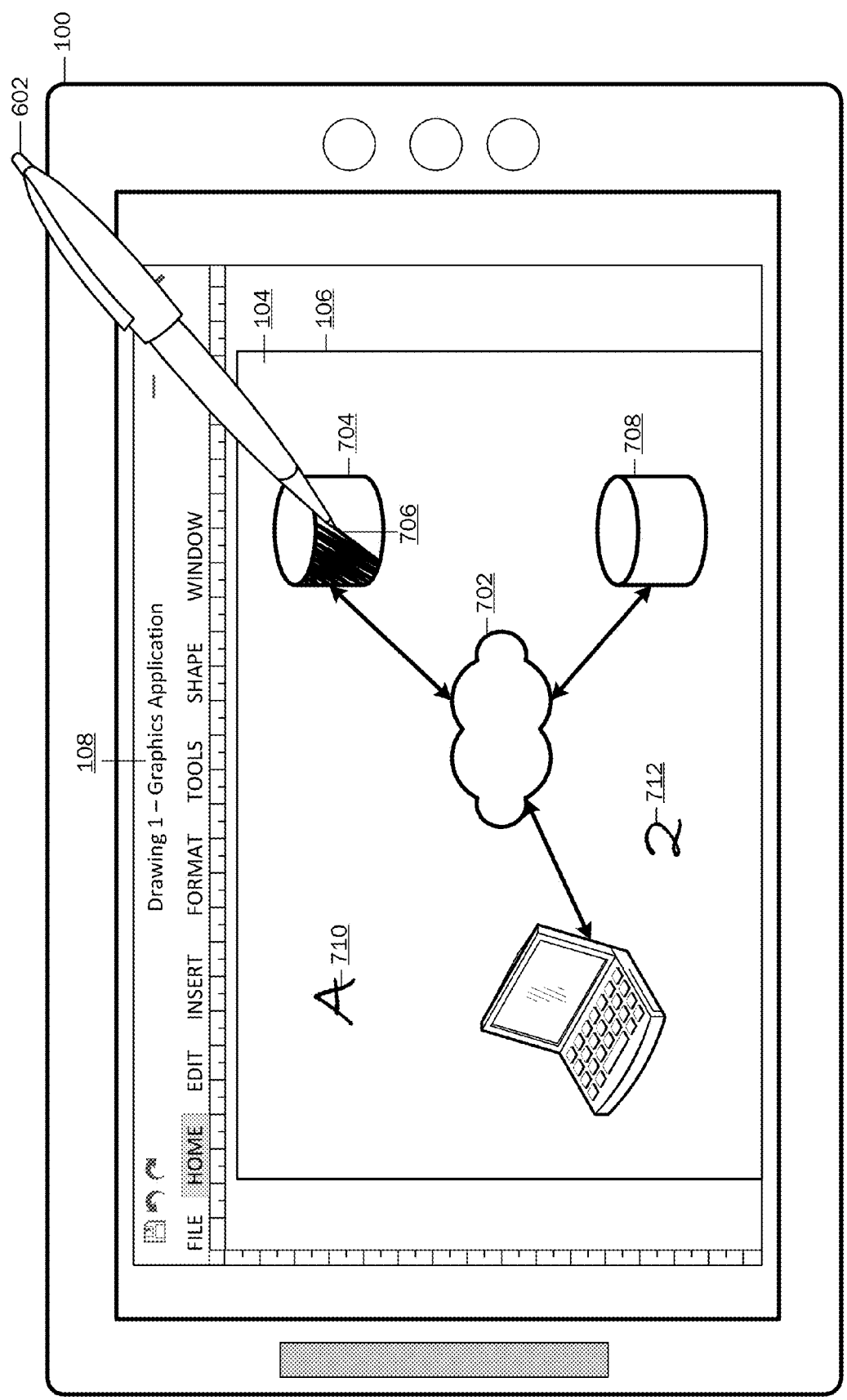
FIG. 7 is an illustration of example non-scribble inputs.

Referring now to FIG. 7, various input items 702, 704, 706, 708, 710, 712 are shown drawn on an electronic document 104, for example, a graphics application document. In this example, the various input items 702, 704, 706, 708, 710, 712 may not be determined as scribble inputs 604 because of such factors as recognized shapes (e.g., 702, 704, 708), a recognized letter (e.g., 710), a recognized number (e.g., 712), or a recognized fill-in (e.g., 706). For example, a fill-in 706 may be recognized as a fill-in and not a scribble input 604 if the input is within a boundary, such as within shape 704 as illustrated.

Figure 8:
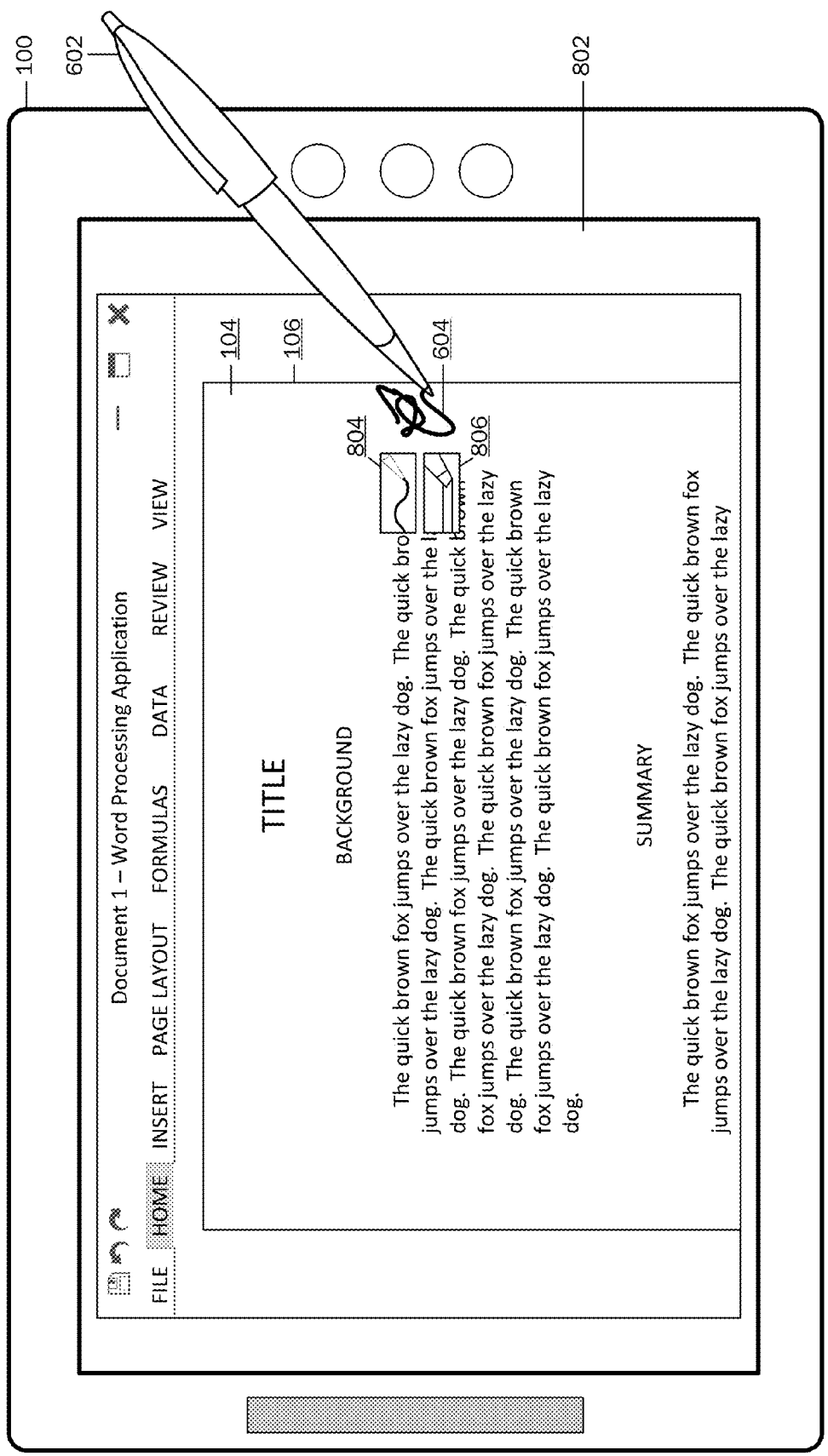
FIG. 8 is an illustration a contextual UI displayed near a scribble input.

According to an embodiment and as illustrated in FIG. 8, when a received input is determined to be a scribble input 604, one or more contextual user interface elements 804, 806 may be presented for allowing a user to select another pen attribute. For example, a user interface element 804 may be provided for selecting an alternative color (e.g., ink color). As another example, a user interface element 806 may be provided for selecting an alternative pen type (e.g., a highlighter versus a pen).

A scribble input 604 may be considered an unwanted piece of ink. Embodiments may provide for an automatic erasure of scribble input 604. According to one embodiment, scribble input 604 may be erased if an alternative pen attribute is selected from a contextual user interface element 804,806. According to another embodiment, scribble input 604 may be erased upon receiving input elsewhere on the screen 802 or input surface (away from the scribble input 604). According to another embodiment, scribble input 604 may be erased after a predetermined amount of time of not receiving additional input after receiving the scribble input 604. Alternatively, if the user continues to draw in relation to the scribble input 604 (e.g., near the scribble), a determination may be made that the input may actually be part of a larger drawing and thus not a scribble. Accordingly, the input may not be erased.

Figure 9:
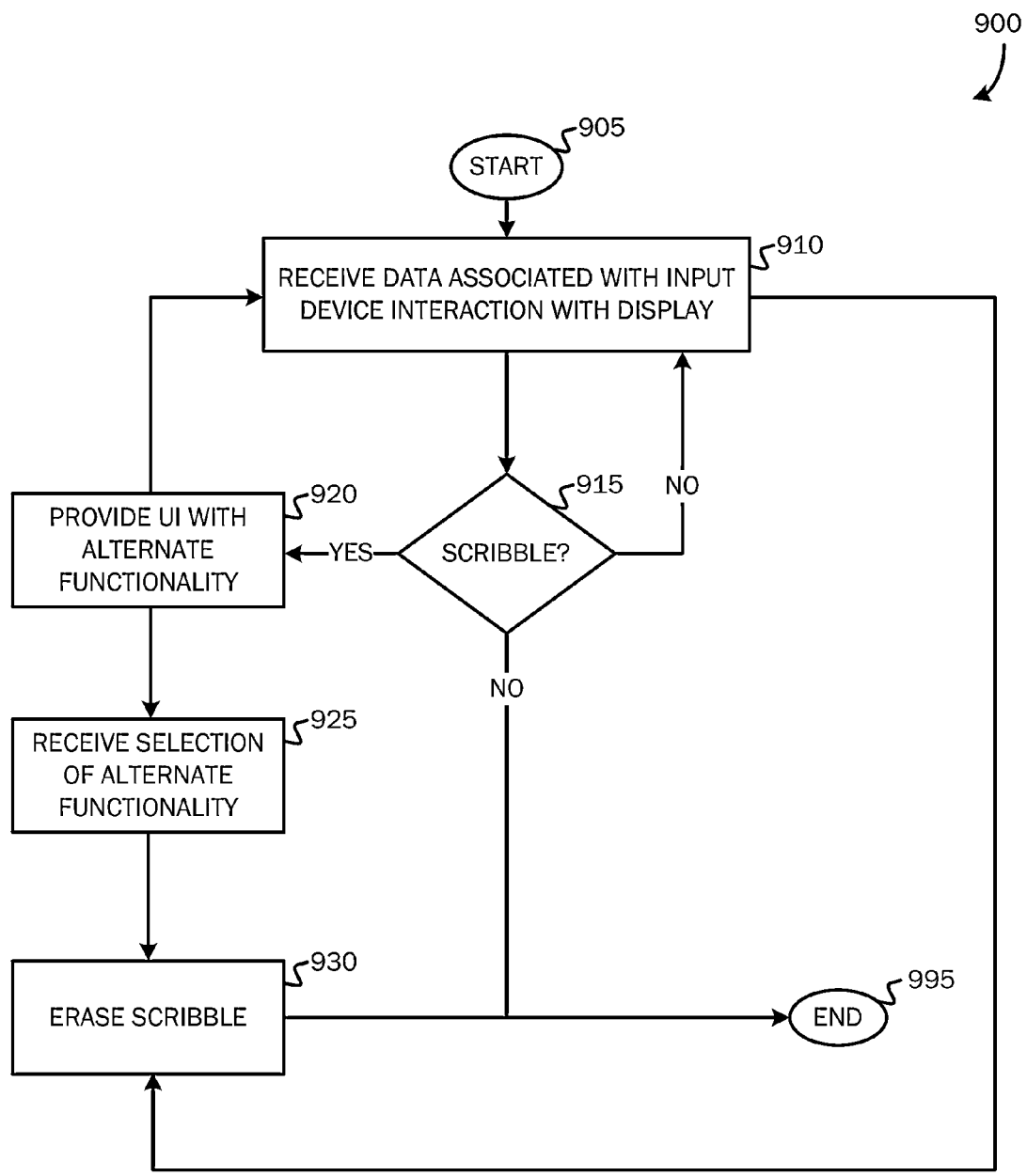
FIG. 9 is a flow chart of a method for detecting scribble input according to an embodiment.

A flow chart of a method for providing scribble recognition is illustrated in FIG. 9. The method 900 starts at OPERATION 905 and proceeds to OPERATION 910 where an input via an input device 102 is received. As described above, an input device 102 may include various types of devices that may be utilized to provide data and control signals to a computing device. For example, an input device 102 may include a digital pen device 602.

The method 900 proceeds to DECISION OPERATION 915, where a determination is made whether the received input may be a scribble input 604. As described above, various factors may be used to determine if a received input may be a scribble input 604 which may include, but are not limited to, location of the input, configuration of the input, a length of time associated with drawing the input, whether a user lifts the digital pen device 602 from the screen or input surface, whether the input is within a boundary, etc.

If the received input is determined not to be scribble input 604, the method 900 may return to OPERATION 910 where additional input is received. If at DECISION OPERATION 915 the received input is determined to be scribble input 604, the method proceeds to OPERATION 920 where one or more contextual user interface elements 804,806 may be presented for selecting alternative pen attributes. For example, a user may scribble on a document 104 with a digital pen device 102 and see that settings of the pen are set to be a thin pen line with blue ink. A number of contextual user interface elements 804,806 may be displayed near the scribble input 106 allowing the user to select to change the pen type.

After one or more contextual user interface elements 804,806 are presented, the method 900 may proceed to OPERATION 925 where a selection of an alternate pen attribute is made. For example, the user may select to change the pen type to a yellow highlighter by selecting a user interface element 806. Upon receiving a selection of an alternate pen attribute, the selected pen attribute may be applied to the digital pen device 602. For example, if a user selects to change the pen type to a yellow highlighter, subsequent input with the digital pen device 602 may have characteristics of a yellow highlighter until the pen attributes are changed again. The method 900 may proceed to OPERATION 930 where the scribble input 604 is erased or removed from the electronic document 104.

Alternatively, after one or more contextual user interface elements 804,806 are presented, the method 900 may return to OPERATION 910 where additional input is received. For example, a user may be content with the current pen attributes and may choose to input data (e.g., write text, add drawings, etc.) into the document 104. Accordingly, the method 900 may proceed to OPERATION 930 where the scribble input 106 is erased. Erasure of scribble input 106 may occur when certain conditions are met, for example, if a predetermined amount of time has passed after a scribble input 106 has been received without further input elsewhere in the document 104 or application 108. As another example, scribble input 106 may be automatically erased when an input device 102 (e.g., digital pen device 602) is lifted from the screen 802 or input surface or after a predetermined amount of time after the input device 102 is lifted from the screen 802 or input surface.

According to embodiments, a mechanism may be provided for undoing an erase if the scribble input 106 erasure is an unwanted action. Machine learning may also be provided wherein if an erasure is undone and a same or similar type of scribble input 106 is later received, the scribble input 106 may not be automatically erased. Additionally, if a scribble input 106 is erased and subsequently another similar scribble input 106 is received in a same or nearby location, the input may not be automatically erased. The method ends at OPERATION 995.

According to another embodiment, feedback 110 may be provided to otherwise affect an automatic erasure of scribble input 106. For example, a user may "scribble" in an electronic document 104 displayed on a tablet computing device 100 with a digital pen device 602 and may subsequently lift the digital pen device 602 from the screen 802 or input surface of the tablet computing device 100. After a predetermined amount of time, a feedback 110, such as haptic feedback, visual feedback, audible feedback, etc. may be communicated to the user via the digital pen device 602 to alert the user that the scribble input 106 is about to be erased. Accordingly, the user may choose to prevent or override the erasure. For example, the user may touch the scribble input 106 or an area on the screen 802 or input surface with the digital pen device 602 or may continue adding to the scribble input 106, which may prevent the scribble input 106 from being erased.

According to another embodiment, feedback 110 may be provided to provide a notification that a received input is being detected to be scribble input 106. For example, a light may be illuminated on the digital pen device 602 when a determination is made that the input is scribble input 106. As another example, a change in the resistance level or friction level between the digital pen device 602 and the computing device may be provided to communicate to the user of detected scribble input 106. As can be appreciated, these are but a few examples of various types of feedback 110 that may be provided in association with scribble recognition.

Figure 10:
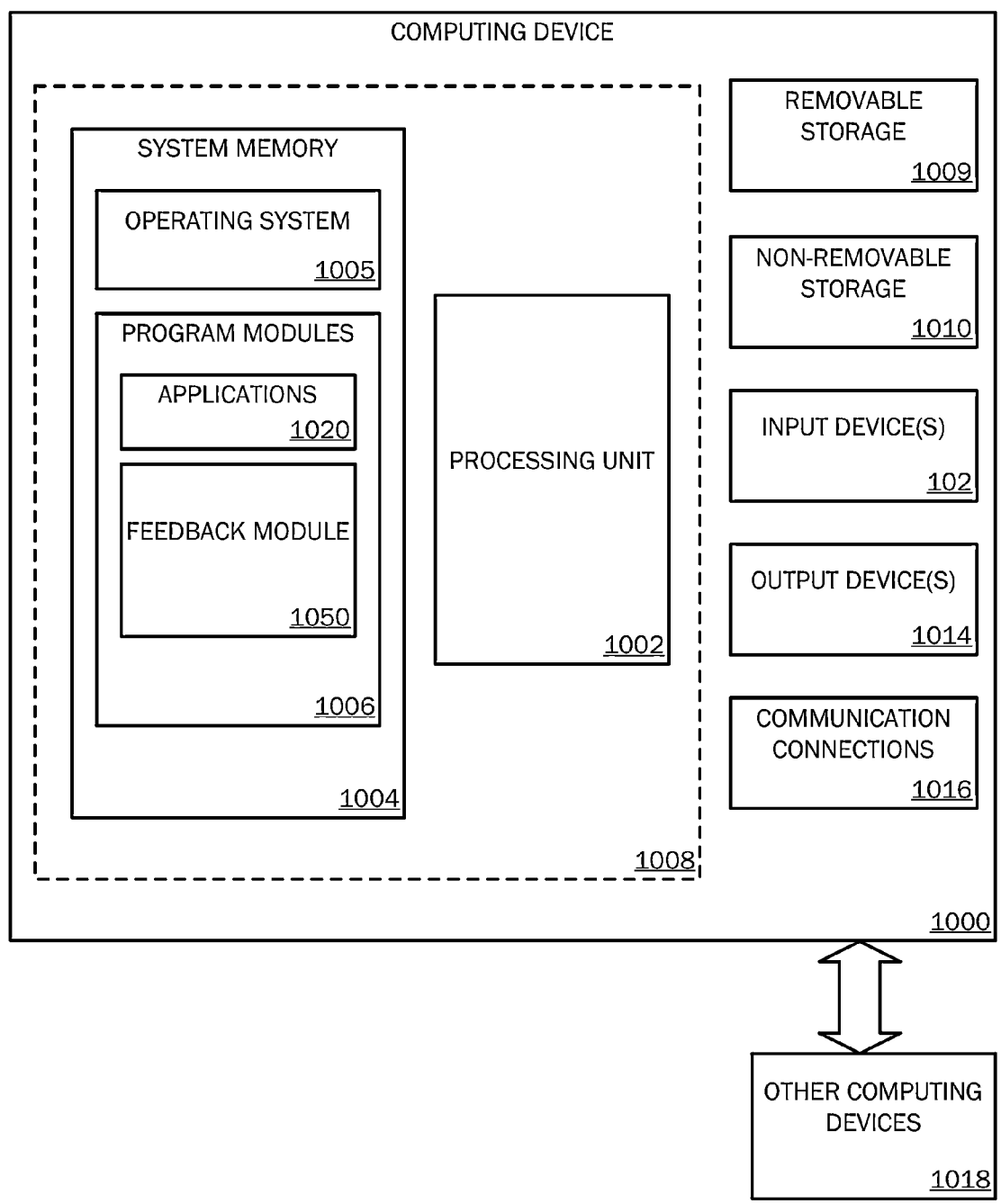
FIG. 10 is a block diagram illustrating example physical components of a computing device with which embodiments of the invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, IP phones, gaming devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. As described above, gesture entry may also include an input made with a mechanical input device (e.g., with a mouse, touchscreen, stylus, etc.), the input originating from a bodily motion that can be received, recognized, and translated into a selection and/or movement of an element or object on a graphical user interface that mimics the bodily motion. FIGS. 10 through 12 and the associated descriptions provide a discussion of a variety of operating environments in which embodiments of the invention may be practiced. However, the devices and systems illustrated and discussed with respect to FIGS. 10 through 12 are for purposes of example and illustration and are not limiting of a vast number of computing device configurations that may be utilized for practicing embodiments of the invention, described herein.

FIG. 10 is a block diagram illustrating example physical components (i.e., hardware) of a computing device 1000 with which embodiments of the invention may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running software applications 1020 such as a feedback module 1050. The operating system 1005, for example, may be suitable for controlling the operation of the computing device 1000. Furthermore, embodiments of the invention may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006, such as the feedback module 1050 may perform processes including, for example, one or more of the stages of the method 500 and method 900. The aforementioned process is an example, and the processing unit 1002 may perform other processes. Other program modules that may be used in accordance with embodiments of the present invention may include electronic mail and contacts applications, word processing applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the feedback module 1050 may be operated via application-specific logic integrated with other components of the computing device 1000 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1000 may also have one or more input device(s) 1012 such as a keyboard, a mouse, a pen, a sound input device, a touch input device, a microphone, a gesture recognition device, etc. The output device(s) 1014 such as a display, speakers, a printer, etc. may also be included. The aforementioned devices are examples and others may be used. The computing device 1000 may include one or more communication connections 1016 allowing communications with other computing devices 1018. Examples of suitable communication connections 1016 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 1004, the removable storage device 1009, and the non-removable storage device 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1000. Any such computer storage media may be part of the computing device 1000.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
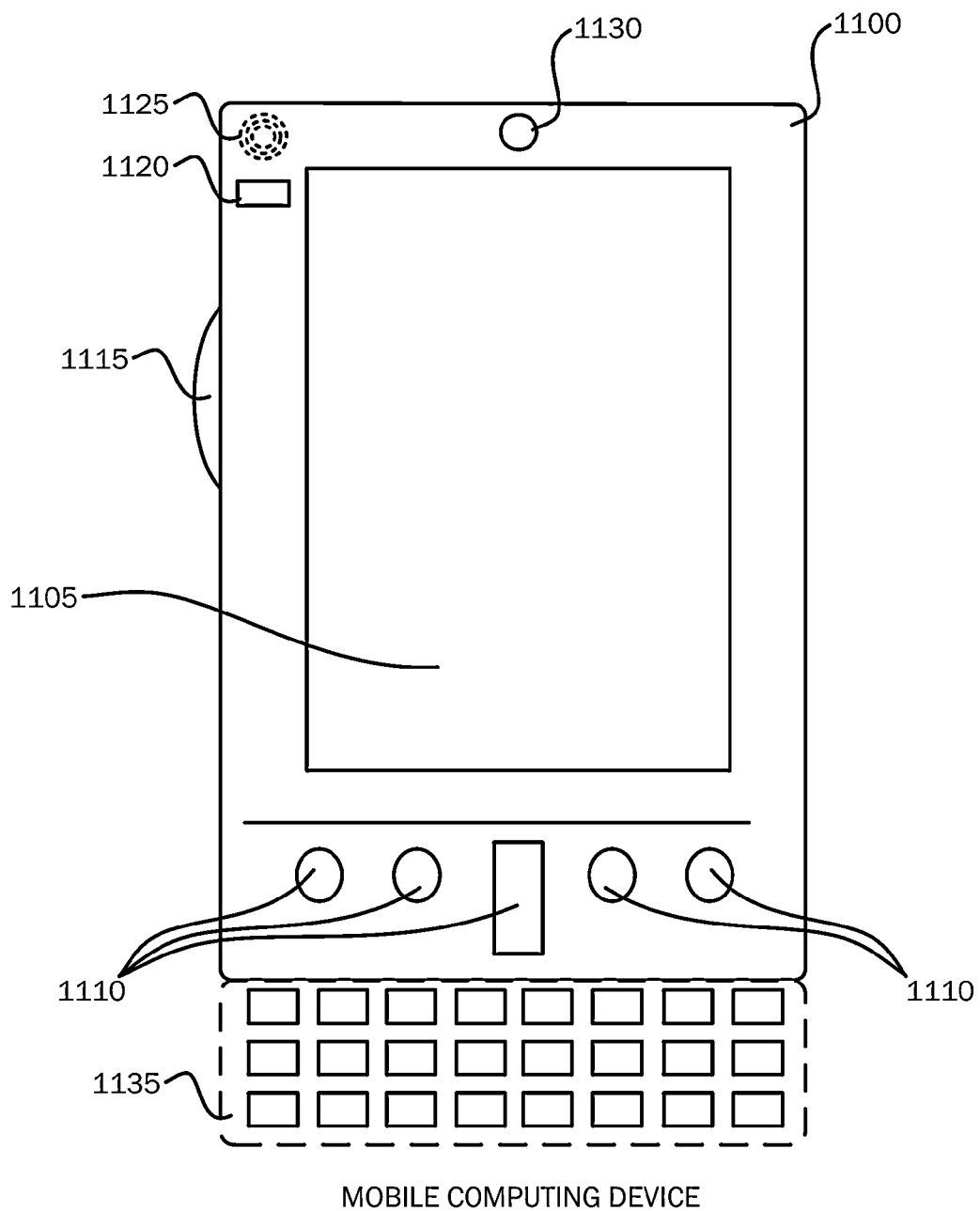
FIGS. 11A and 11B are simplified block diagrams of a mobile computing device with which embodiments of the present invention may be practiced.
Figure 11B:
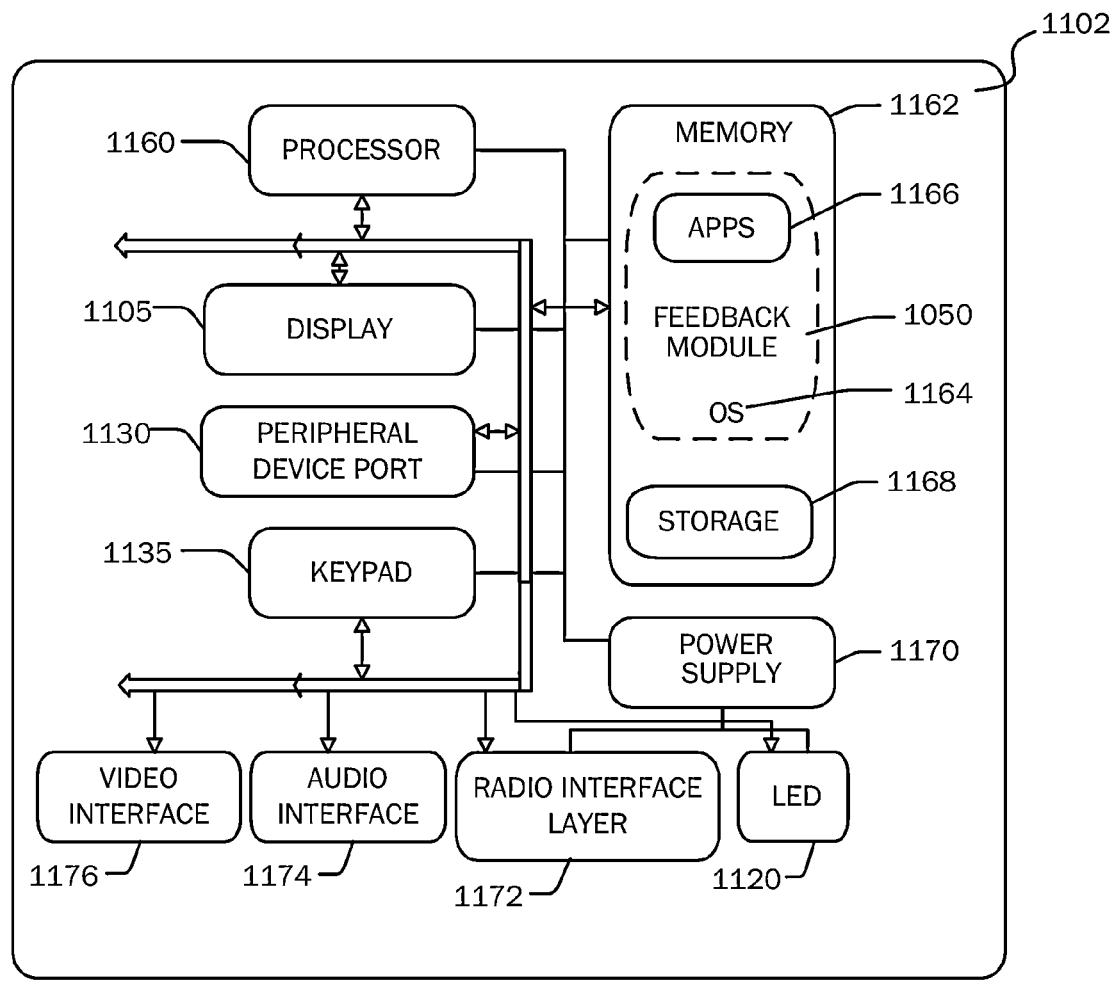
Figure 12:
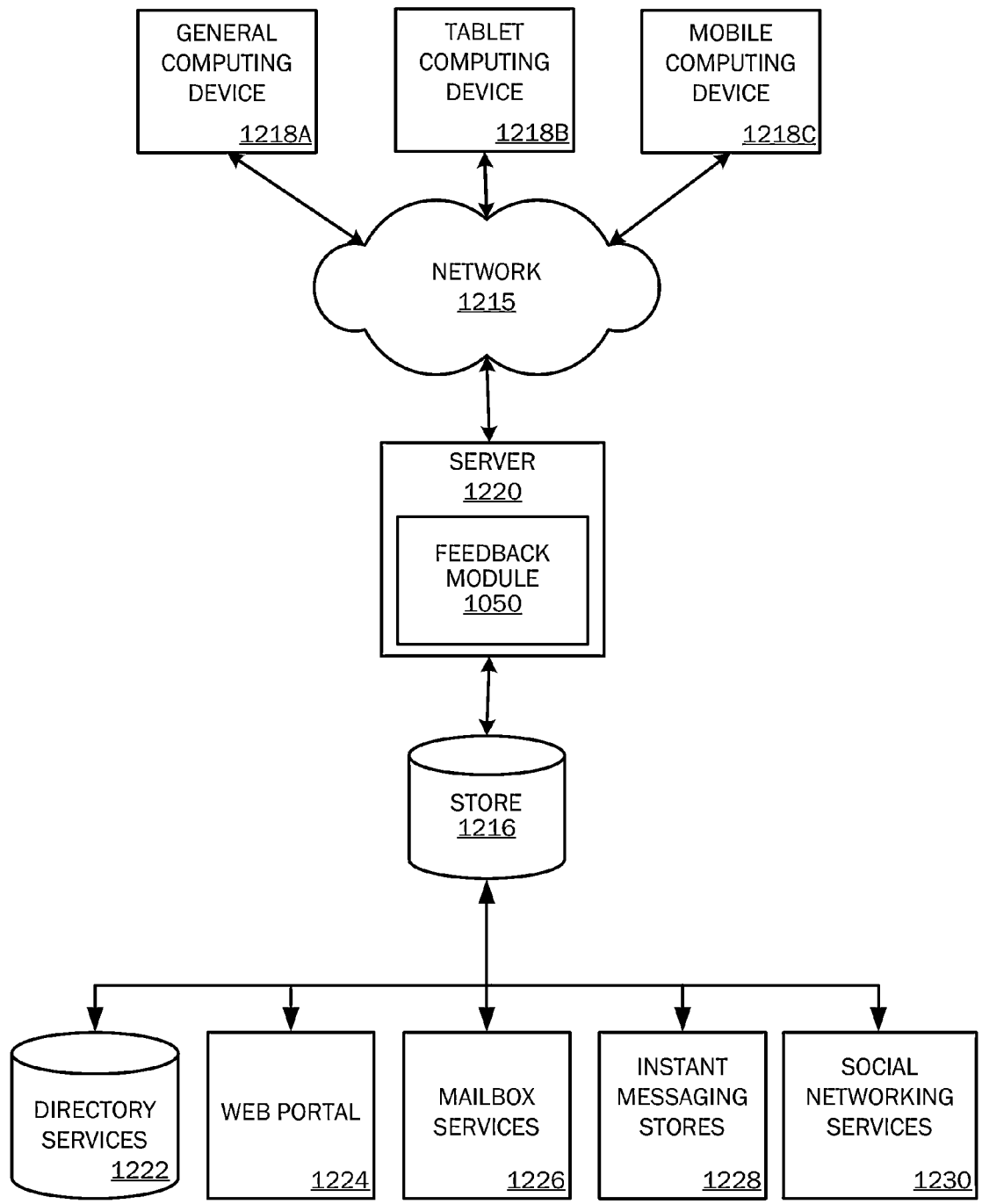
FIG. 12 is a simplified block diagram of a distributed computing system in which embodiments of the present invention may be practiced.

FIGS. 11A and 11B illustrate a mobile computing device 1100, for example, a mobile telephone, a smart phone, a tablet personal computer 100, a laptop computer, and the like, with which embodiments of the invention may be practiced. With reference to FIG. 11A, an exemplary mobile computing device 1100 for implementing the embodiments is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative embodiments, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some embodiments, the mobile computing device 1100 incorporates a vibration transducer for providing the user with tactile feedback. In yet another embodiment, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one embodiment of a mobile computing device. That is, the mobile computing device 1100 can incorporate a system (i.e., an architecture) 1102 to implement some embodiments. In one embodiment, the system 1102 is implemented as a "smart phone" capable of running one or more applications (e.g., browser, e-mail, calendaring, contact managers, messaging clients, games, and media clients/players). In some embodiments, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the feedback module 1050 described herein.

The system 1102 has a power supply 1170, which may be implemented as one or more batteries. The power supply 1170 might further include an external power source, such as an AC adapter or a powered docking cradle that supplements or recharges the batteries. The system 1102 may also include a radio 1172 that performs the function of transmitting and receiving radio frequency communications. The radio 1172 facilitates wireless connectivity between the system 1102 and the "outside world", via a communications carrier or service provider. Transmissions to and from the radio 1172 are conducted under control of the operating system 1164. In other words, communications received by the radio 1172 may be disseminated to the application programs 1166 via the operating system 1164, and vice versa.

The radio 1172 allows the system 1102 to communicate with other computing devices, such as over a network. The radio 1172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1102 provides notifications using the visual indicator 1120 that can be used to provide visual notifications and/or an audio interface 1174 producing audible notifications via the audio transducer 1125. In the illustrated embodiment, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168. Computer storage media may include volatile and nonvolatile, removable and non-removable media implemented in any method or technology for storage of information, such as computer readable instructions, data structures, program modules, or other data.

Data/information generated or captured by the mobile computing device 1100 and stored via the system 1102 may be stored locally on the mobile computing device 1100, as described above, or the data may be stored on any number of storage media that may be accessed by the device via the radio 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio 1172 or via a distributed computing network. Similarly, such data/information may be readily transferred between computing devices for storage and use according to well-known data/information transfer and storage means, including electronic mail and collaborative data/information sharing systems.

FIG. 12 illustrates one embodiment of the architecture of a system for providing the feedback module 1050 to one or more client devices, as described above. Content developed, interacted with or edited in association with the feedback module 1050 may be stored in different communication channels or other storage types. For example, various documents may be stored using a directory service 1222, a web portal 1224, a mailbox service 1226, an instant messaging store 1228, or a social networking site 1230. The feedback module 1050 may use any of these types of systems or the like for providing feedback, as described herein. A server 1220 may provide the feedback module 1050 to clients. As one example, the server 1220 may be a web server providing the feedback module 1050 over the web. The server 1220 may provide the feedback module 1050 over the web to clients through a network 1215. By way of example, the client computing device 1218 may be implemented as the computing device 1000 and embodied in a personal computer 1218a, a tablet computing device 1218b and/or a mobile computing device 1218c (e.g., a smart phone). Any of these embodiments of the client computing device 1218 may obtain content from the store 1216. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

We claim:

1. A method for providing feedback via an input device, the method comprising:
   receiving a first input on an input surface via an input device, wherein the first input is received at a location corresponding to a margin of an electronic document;
   based on the location of the received first input on the input surface being in the margin of the electronic document and a length of time associated with drawing the received first input, determining if the received first input is associated with a scribble input intended to test pen attributes;
   in response to determining that the received first input is associated with the scribble input intended to test pen attributes, making a determination whether to erase the scribble input, wherein making the determination to erase the scribble input comprises:
      receiving a second input via the input device;
      determining that the second input is not in the margin of the electronic document;
      evaluating a size of the second input relative to the scribble input; and
      determining, based on the second input not being in the margin and the size of the second input, that the second input is not a continuation of the scribble input; and
   in response to making the determination to erase the scribble input, providing feedback via the input device that the scribble input is about to be erased.

2. The method of claim 1, wherein providing feedback via the input device comprises providing one or more of:
   a haptic feedback;
   a visual feedback; or
   an audible feedback.

3. The method of claim 2, wherein providing the haptic feedback includes providing a vibration.

4. The method of claim 2, wherein providing the haptic feedback includes providing a change in a friction level between an input portion of the input device and the input surface for receiving the input via the input device.

5. The method of claim 2, wherein providing the haptic feedback includes providing a movement of the input device via an internal gyroscope.

6. The method of claim 1, wherein if the received first input is associated with the scribble input, further comprising erasing the scribble input after a predetermined amount of time after receiving the scribble input.

7. The method of claim 1, wherein no portion of the second input overlaps the received first input.

8. The method of claim 1, wherein the determination that the received first input is scribble input is further based on the received first input not being recognized as an alphanumeric character, a symbol, or a shape.

9. A system for recognizing scribble input intended to test pen attributes, the system comprising:
   a memory storage; and
   a processing unit coupled to the memory storage, wherein the processing unit is operative to:
      receive first input via an input device, wherein the first input is received at a location corresponding to a margin of an electronic document;
      based on the location of the received first input on an input surface being in the margin of the electronic document and a length of time associated with drawing the received input, determine if the received first input is scribble input intended to test pen attributes;
      determine whether to erase the scribble input by:
         receiving a second input via the input device;
         determining that the second input is not in the margin of the electronic document;
         evaluating a size of the second input relative to the scribble input; and
         determining, based on the second input not being in the margin and the size of the second input, that the second input is not a continuation of the scribble input; and
      erase, when the second input is determined not to be a continuation of the scribble input, the scribble input upon receiving the second input away from the scribble input.

10. The system of claim 9, wherein the processing unit is further operative to, upon determining the received first input is scribble input intended to test pen attributes, provide one or more selectable alternative pen attributes for further input.

11. The system of claim 10, wherein the processing unit is further operative to receive a selection of an alternative pen attribute and apply the selected alternative pen attribute to the input device.

12. The system of claim 9, wherein the processing unit is further operative to determine if the received first input is scribble input based on one or more of:
   a configuration of the input; or
   a length of time associated with receiving additional input after receiving the input.

13. A method for testing input device attributes, the method comprising:
   receiving first input on an input surface via an input device;
   determining if the received first input is associated with a scribble input for determining attributes of the input device based on a location corresponding to a margin of an electronic document of the received first input on the input surface;
   in response to determining that the received first input is associated with the scribble input, making a determination whether to erase the scribble input, wherein making the determination to erase the scribble input comprises:
      receiving a second input via the input device;
      evaluating a location of the second input to the scribble input;

determining that the location of the second input to the scribble input is not in the margin of the electronic document; and determining, based on the location of the second input, that the second input is not a continuation of the scribble input; and based on the received first input being associated with the scribble input, erasing the scribble input, but not the second input, after a predetermined amount of time after receiving the scribble input.

14. The method of claim 13, wherein making the determination to erase the scribble input further comprises receiving an indication of receiving the second input via the input device away from the scribble input.

15. The method of claim 13, wherein making the determination to erase the scribble input further comprises detecting a passing of a predetermined amount of time after receiving the scribble input without receiving additional input.

16. The method of claim 15, further comprising receiving an indication to cancel erasing the scribble input and cancelling erasing the scribble input.

17. The method of claim 16, wherein receiving the indication to cancel erasing the scribble input includes receiving the second input on the input surface via the input device.

18. The method of claim 13, wherein providing feedback via the input device comprises providing one or more of:
a haptic feedback;
a visual feedback; or
an audible feedback.

19. The method of claim 13, wherein receiving each input on the input surface via an input device comprises receiving each input via a digital pen device.

20. The method of claim 13, wherein the location of the received second input is in the body of the electronic document.

* * * * *